Aug. 31, 1926.
A. T. CASSELL ET AL
1,598,364
MACHINE FOR SHREDDING CANS
Filed March 18, 1925  2 Sheets-Sheet 2
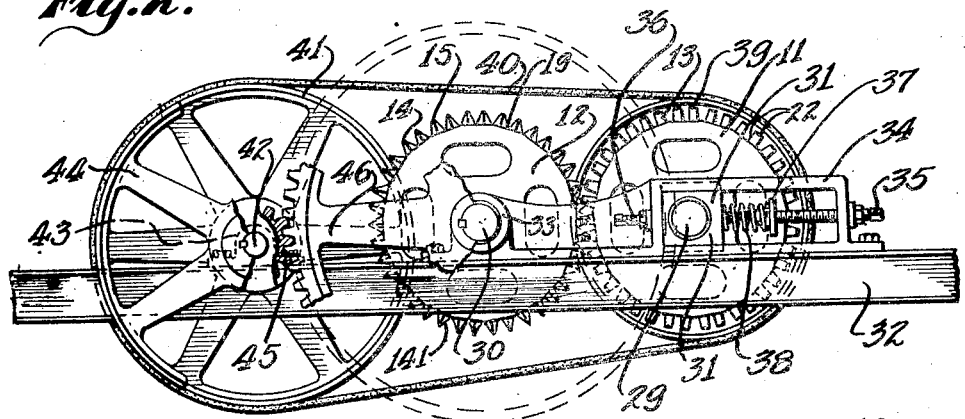
Inventors
Andrew T. Cassell
Charles N. Flinn
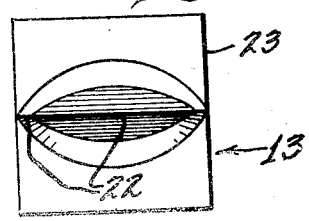
By Lyon & Lyon
ATTORNEYS.

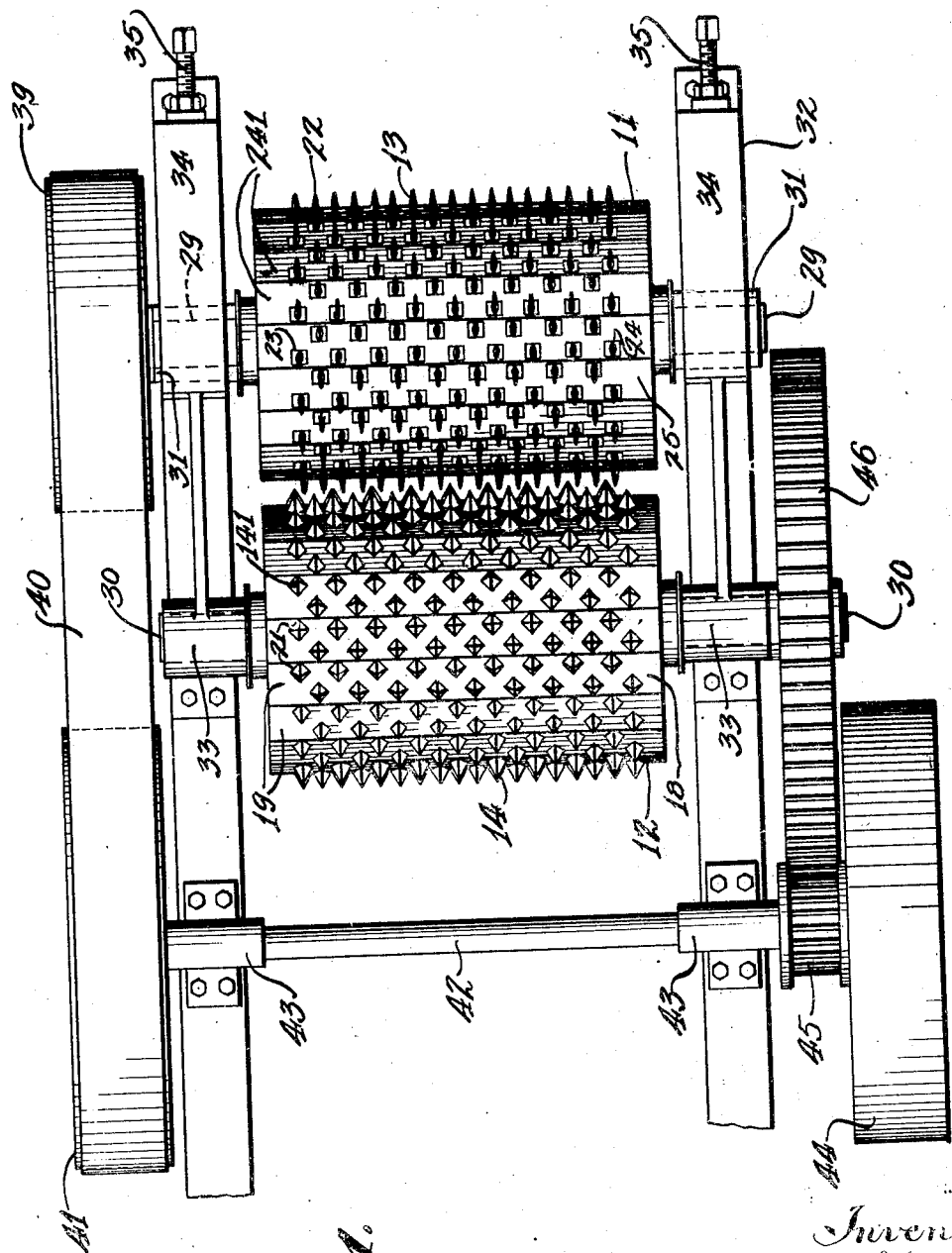

Patented Aug. 31, 1926.

1,598,364

UNITED STATES PATENT OFFICE.

ANDREW T. CASSELL AND CHARLES N. FLINN, OF LOS ANGELES, CALIFORNIA.

MACHINE FOR SHREDDING CANS.

Application filed March 18, 1925. Serial No. 16,376.

This invention relates to machines for shredding or cutting cans so as to prepare said cans for detinning, or to facilitate baling of the cans.

An object of the invention is to cut, shred and flatten tin cans.

Another object is to provide an efficient machine for accomplishing the shredding, cutting and flattening.

Further objects and advantages will appear in the subjoined detailed description.

The accompanying drawings illustrate the invention:

Fig. 1 is a plan view of a machine for shredding tin cans, constructed in accordance with the provisions of this invention.

Fig. 2 is a side elevation from the bottom of Fig. 1, portions of one of the pulleys, spur gear and pinion being broken away.

Fig. 3 is an enlarged fragmental section of one of the rollers.

Fig. 4 is a perspective view of one of the impaling members of the roller shown in Fig. 3.

Fig. 5 is an enlarged fragmental section of the other roller.

Fig. 6 is an enlarged view of one of the cutting blades looking at the cutting edge thereof.

There are provided two spaced rollers 11, 12 having substantially radially extending projections or teeth 13, 14, respectively. The projections 14 are placed in staggered relation and are preferably more or less pointed, as indicated at 15, so as to impale or puncture the cans that are discharged onto or between the rollers. In this instance the projections 14 have portions 141 of pyramid form and have stems 16 which engage in holes 17 extending through the circumferential wall 18 of the roller 12. In this instance the wall 18 has flat faces 19, said faces being sufficiently wide to accommodate two longitudinally extending rows of the projections 14. The stems 16 project from the inner face 19 of the wall 18 and are threaded to receive nuts 20. The outer faces 19 are provided with angular sockets 21 to receive the base of the portions 141 of the projections 14, thus preventing turning of the projections about their longitudinal axes.

The outer ends of the projections 13 are in the form of blades and have cutting edges 22, said projections being mounted so that the cutting edges extend in planes at right angles to the longitudinal axis of the roller 11. The bases of the projections are angular, as indicated at 23, and said bases seat in angular sockets 24 in the outer flat faces 241 of the circumferential wall 25 of the roller. The faces 241 are sufficiently wide to accommodate two longitudinally extending rows of the projections 13. The projections 13 have stems 26 which extend through holes 27 in the wall 25 and which project from the inner face of said wall to receive nuts 28 threaded onto said stems. The projections 13 are in staggered relation and intermesh with the projections 14.

The rollers 11, 12 are provided with shafts 29, 30, respectively, whereby said rollers are rotated. The shaft 29 is journaled in bearings 31 on the frame members 32 and the shaft 30 is journaled in bearings 33 also mounted on the frame members 32.

Preferably the bearings 31 are adjustably mounted so that relative adjustment of the rollers 11, 12 toward and from each other can be made. For this purpose, the bearings 31 are slidably mounted in supports 34 and screws 35, 36 are provided in the supports 34 to move the bearings 31 and hold said bearings in adjusted position. In this instance, the screws 36 bear against the bearings 31 and each of the screws 35 is provided with a shoulder 37 and there is a coil spring 38 between the shoulder 37 and the bearing 31 so that the roller 11 will be yieldingly held toward the roller 12 thus, when the machine is in operation, insuring against too great a strain coming upon the rollers and their parts as the material is passing between the rollers.

The shafts may be driven by any suitable means and it is preferable that said shafts be driven at different speeds so that one of the rollers will turn at a higher speed than the other. It is preferable that the roller 11 turn at a much higher speed than the roller 12. For example, the roller 11 is preferably operated at a speed of eight revolutions thereof to one of the roller 12. To operate the shafts, the shaft 29 is provided with a pulley 39 operated by a belt 40 which in turn is operated by a pulley 41 mounted on a jack shaft 42 journaled in bearings 43 on the frame members 32. The shaft 42 is driven by a pulley 44 and is provided with a spur pinion 45 meshing with a spur gear 46 on the shaft 30. This driving mechanism for the rollers provides, not only for different speeds of the rollers, but for operation of said rollers in opposite directions. In practice, the rollers will be driven so that their upper sides move toward one another and the tin cans operated on will be discharged by the conveyor belt or other suitable device onto the rollers and between the same. The teeth or blades of the drums will penetrate, cut, tear and shred the cans and the rollers will flatten the cans and discharge the same downwardly between said rollers into a suitable bin space provided thereberneath.

Since the roller 11 rotates at a much higher speed than the roller 12, the action of the teeth 14 is to penetrate the can walls, thus holding the can fast on the roller 12, and said roller then carries the can at a relatively low speed and the teeth or blades 13 traveling at a relatively high speed, function to cut and shred the can walls more or less into strips and the teeth 13, 14 carry the shredded can downwardly through the space between the rollers, thus flattening the tin to a considerable degree so that baling thereof can be readily effected.

We claim:

1. A machine for shredding cans comprising spaced rollers, one roller being provided with pointed projections and the other roller with projections forming cutting blades at their outer ends, and means to rotate the first roller at a lower speed and the second roller at a higher speed with the upper surfaces of the rollers moving toward each other.

2. A machine for shredding cans comprising spaced rollers, one roller being provided with pointed projections and the other roller with projections forming cutting blades at their outer ends, the cutting blades having their edges extending in planes at right angles to the longitudinal axis of the roller, and means to rotate the first roller at a lower speed and the second roller at a higher speed with the upper surfaces of the rollers moving toward each other.

3. A machine for shredding cans comprising spaced rollers having projections on their peripheries, one of the rollers being mounted to move away from the other roller, means yieldingly holding the first mentioned roller toward the other roller, a rotatably mounted shaft, a pulley on said shaft, a belt on the pulley, a second pulley driven by the belt and operating the first mentioned drum roller, means operably connecting the shaft with the second roller, and operating means for the shaft.

4. A machine for shredding cans comprising spaced rollers provided with projections to catch and shred cans fed between them, the outer ends of the projections of one roller forming blades, and means to operate the rollers in opposite directions.

5. A machine for shredding cans comprising spaced rollers provided with projections to catch and shred cans fed between them, the projections of one roller being pointed and the outer ends of the projections of the other roller forming blades, and means to operate the rollers in opposite directions.

6. A machine for shredding cans comprising spaced rollers provided with projections to catch and shred cans fed between them, the projections of one roller being pointed and the outer ends of the projections of the other roller forming blades, and means to operate the rollers in opposite directions at different speeds.

7. A machine for shredding cans comprising spaced rollers provided with projections to catch and shred cans fed between them, the projections of one roller being pointed and the outer ends of the projections of the other roller forming blades and being offset relative to the pointed projections, and means operating the first roller at a lower speed and the second roller at a higher speed.

8. A machine for shredding cans comprising spaced rollers provided with projections to catch and shred cans, means operating the rollers in opposite directions, one of the rollers being mounted to move away from the other roller, and means yieldingly holding the first mentioned roller toward the other roller.

Signed at Los Angeles, California, this 11th day of March, 1925.

ANDREW T. CASSELL.
CHARLES N. FLINN.